United States Patent [19]

Stein et al.

[11] 3,917,523

[45] Nov. 4, 1975

[54] ELECTROCHEMICAL ELECTRODE STRUCTURE

[75] Inventors: Bernard Stein, Andover; Leo M. Patrician, Lexington, both of Mass.

[73] Assignee: Instrumentation Laboratory, Inc., Lexington, Mass.

[22] Filed: Dec. 20, 1973

[21] Appl. No.: 426,517

[52] U.S. Cl. .............................. 204/195 F; 204/279
[51] Int. Cl.² .......................................... G01N 27/28
[58] Field of Search ............ 204/195, 1 T, 252, 263, 204/279; 324/30 R, 30 C

[56] References Cited
UNITED STATES PATENTS

| | | | |
|---|---|---|---|
| 3,505,196 | 4/1970 | Dahms | 204/195 |
| 3,681,205 | 8/1972 | Ducksbury et al. | 204/1 T |
| 3,723,280 | 3/1973 | Harnoncourt et al. | 204/195 P |
| 3,763,422 | 10/1973 | MacPhee et al. | 324/30 R |

*Primary Examiner*—G. L. Kaplan

[57] ABSTRACT

A liquid junction flow control component for use in an electrode system for electrochemical analysis includes a housing having a flow control member support portion, a reference electrolyte passage having a port at the flow control member support portion, protecting structure forward of the support portion, and a flow control member secured to the support portion and extending across the port, the protecting structure providing protection for the flow control member.

11 Claims, 5 Drawing Figures

ELECTROCHEMICAL ELECTRODE STRUCTURE

SUMMARY OF INVENTION

This invention relates to electrochemical electrode systems and more particularly to electrochemical electrode systems which employ a liquid junction between a sensing electrode and a reference electrode.

In such electrochemical measurement systems, the potential difference between a sensing electrode and a reference electrode is a function of the concentration of a specific ion in the material of interest. Such an electrochemical electrode system is used for measuring hydrogen ion concentration in solutions, for example. A particular use of such an electrode system is for pH measurements of blood samples.

A typical pH measurement of blood involves the measurement of the sum of a series of potentials: the potential of a sensing electrode within a first chamber; the potentials on opposite surfaces of a pH sensitive glass membrane, the blood sample to be measured being on one surface of the glass membrane; the junction potential at the interface of the blood sample and a reference electrolyte solution; and the potential of a reference electrode immersed in the reference electrolyte. The junction potential at the sample-reference electrolyte interface is related to differences in ionic mobilities in the sample and the reference electrolyte (due either to dissimilarity in composition and/or concentration), the three-dimensional geometry of the sample-electrolyte interface, and constituents, such as colloidal particles in the sample. A major source of difficulty in making blood pH measurements resides in characteristics of the interface (reference junction) between the blood and the electrolyte.

While open reference junctions can be employed, it is frequently preferred to employ a restricted flow junction which can be considered as a collection of microscopic flow paths which restrict the flow of the reference electrolyte. The restricted flow type of liquid junction offers advantages over the open type of liquid junction as the reference electrolyte flow is controlled and valving and pressure differential considerations are simplified or eliminated. However, the restricted flow junction must have well-defined mechanical characteristics, particularly for blood pH meaasurements, which characteristics are not distorted during use of the system.

It is an object of this invention to provide a novel and improved electrochemical electrode system which provides a reproduceable electrical junction potential.

Another object of the invention is to provide a novel and improved leak junction structure which is particularly adapted for use in electrochemical measurements of blood.

Another object of the invention is to provide an improved flow control component for an electrochemical measurement system.

Still another object of the invention is to provide a novel and improved electrochemical measurement system in which small blood samples can be measured repeatably and with accuracy.

Another object of the invention is to provide a novel and improved leak junction structure which is simple and economical in construction and which facilitates the removal for replacement or repair of the flow control member.

In accordance with the invention, there is provided an electrode system for the electrochemical analysis of a sample which includes structure that defines a first chamber adapted to contain an electrolyte and structure that defines a second chamber adapted to contain the material to be analyzed. A replaceable component carries a flow control member for providing a controlled liquid flow path for establishing an ionic junction between the electrolyte and the sample material to be measured by the electrode system. That component includes coupling structure for connection to one of the chambers and a guide surface which is adapted to mate with a cooperating guide surface, the two guide surfaces establishing straight line motion of the flow control member clamp surface on which the flow control member is mounted towards a cooperating clamp surface and alignment of the effective openings of the two chambers. Clamp structure secures the two clamp surfaces in juxtaposed relation while not imposing shear force on the interposed flow control member and establishes a liquid junction geometry in a well defined relationship.

In a preferred embodiment, the flow control member is a thin membrane of hydrophillic polycarbonate material that has a multiplicity of substantially parallel passages of equal length that extend through the member. The diameter of each passage is less than 0.5 micron and, due to the pore density and the thinness of the membrane, the electrical resistance of the junction in use is less than 100 ohms. The membrane is secured to a planar clamp surface of the replaceable structure by a sheet member, both sides of which carry an adhesive. An aperture in the sheet member defines the effective reference electrolyte chamber opening or port. The replaceable structure also includes a vent passage that extends away from the reference electrolyte port toward a vent port, and cooperating valve structure is provided to close the port. Guide projections extend forwardly of the surface on which the membrane is mounted and protect the membrane secured on that surface against contamination and mechanical damage as well as controlling the initial (piloting) and final positioning of the membrane relative to the sample chamber port. The clamp structure includes a frame member and a threaded clamp member that applies axial force in alignment with the two chamber openings and the juxtaposed membrane. Thus the membrane is disposed in a recess which provides protection and the recess structure assists in assuring proper alignment and straight line force (both in installation and in clamping) so that uniformity between installed flow control membranes is enhanced. Connected to the replaceable structure is a reference electrode system and the pressure on the electrolyte side of the leak junction is normally atmospheric and slightly greater than on the sample side.

The invention provides a restricted leak junction arrangement in an electrochemical electrode system which functions to reproduceably provide junction potential measurements of accuracy comparable to those obtained with open junction types of systems. Replacement of the leak junction member is facilitated and critical geometry characteristics of the flow control member and interrelationships between the sample and electrolyte flow passages are maintained with precision. The system operates with excellent stability, response characteristics, and uniformity in a flow through system which can be subjected to temperature and pressure cycling such as encountered in automated fluid handling systems.

Other objects, features and advantages will be seen as the following description of a particular embodiment progresses, in conjunction with the drawings, in which.

DESCRIPTION OF PARTICULAR EMBODIMENT

Figure 1:
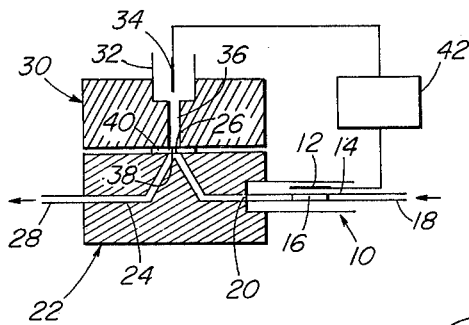
FIG. 1 is a diagrammatic view of an electrochemical measurement system in accordance with the invention.

With reference to FIG. 1, there is shown an electrode chamber 10 having a silver silver chloride sensing electrode 12 in it, and a glass tube 14, one section 16 of which is composed of pH sensitive glass, extending through it. The inlet end 18 of tube 14 is connected to a sample inlet and outlet end 20 is connected to liquid junction component member 22 through which extends passage 24 that has a jog or bend portion to offset port 26 in one wall. Sample flow from passage 24 is through tube 28 to waste, appropriately controlled as by a vacuum pump and/or valving. A cooperating liquid junction support structure 30 is connected to reference electrode chamber 32. Chamber 32 is filled with a suitable electrolyte such as KCl. An $Hg/Hg_2Cl_2$ (calomel) electrode 34 is disposed in that chamber. Chamber 32 is in communication with member 30 which has a passage 36 that extends to a port 38. A flow control member 40 is disposed at the interface between ports 26 and 38 of members 22 and 34, respectively. Electrodes 12 and 32 are connected to measuring circuitry 42 which provides an indication of electrical potential between electrodes 12 and 32.

Figure 2:
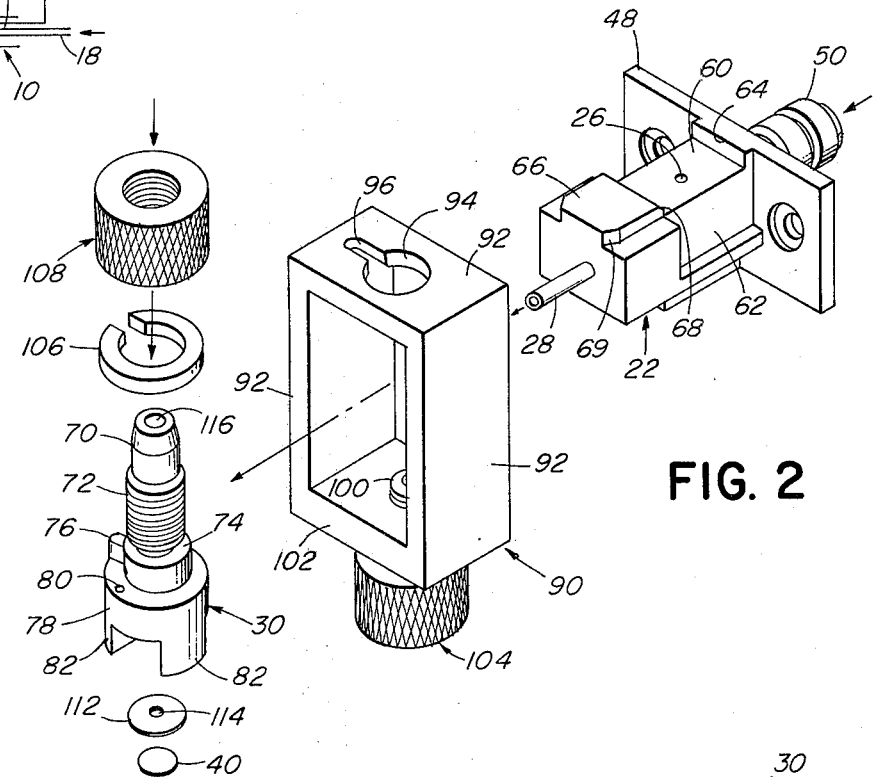
FIG. 2 is an exploded view of components of the leak junction structure employed in the embodiment shown in FIG. 1.

Additional details of the leak junction structure components may be seen with reference to FIG. 2. Component 22 is made of transparent acrylic plastic and includes a support flange 48. Rearwardly of flange 48 is a coupling section 50 which receives insert 52 (FIG. 4) into which in turn an ultramicro pH electrode is inserted. A sleeve, received over coupling section 50, is sealed by O-rings 56 disposed in grooves 58 (also shown in FIG. 4). Forward of flange 48 is a body section which has a planar surface 60 in which sample passage port 26 is disposed. A first set of parallel guide surfaces 62 extend perpendicularly from surface 60, and a second set of parallel guide surfaces 64 extend perpendicularly from surface 60 in the opposite direction from surfaces 62. Boss 66, on which one guide surface 64 is formed, also includes inclined lead surfaces 68 and 69.

Cooperating leak junction component 30 has a coupling section 70 which receives a connection to reference electrolyte chamber 32; an externally threaded portion 72; a collar portion 74 that includes projecting key 76; a body portion 78 which has a vent port 80 in one surface and reference electrolyte port 38 in a second surface; and two depending protective flanges 82 that define parallel guide surfaces spaced about 0.4 inch apart.

Clamp structure 90 includes a frame 92 of rectangular configuration that has a circular shaped aperture 94 and a radially projecting key slot 96 in wall 98; and a threaded hole 100 in opposite wall 102 that receives clamp screw 104. Also cooperating with the junction member 30 and clamp structure 90 is a C-shaped seal member 106 and a clamp nut 108.

Flow control member 40 is secured to surface 110 and over port 38 by a disc 112 of polytetrafluoroethylene (Teflon) self-adhering tape that has a hole 114 about one mm. in diameter that is coaxially aligned with port 38.

Flow control member 40 is a disc of polycarbonate material about ten microns in thickness and that has a multiplicity of parallel passages or pores, each about 0.1 micron in diameter. Flow control disc 40 is secured by tape disc 112 against surface 110 and defines the base of a chamber 116 (see FIG. 4) to which the reference electrolyte is supplied. Vent passage 120 (FIG. 4) extends diagonally from the base of chamber 116 (port 38) to vent port 80.

Figure 3:
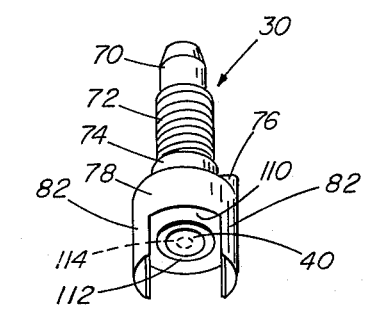
FIG. 3 is a perspective view of the replaceable membrane support component of the structure shown in FIG. 2.

Member 30 is normally provided, as shown in FIG. 3, with disc membrane 40 secured to surface 110 by adhesive disc 112, flanges 82 providing physical protection that minimizes the risk of mechanical damage or contamination of member 40. In assembling the junction structure, seal 106 is seated on the upper surface of body 78 over vent port 80 so that seal 106 may be clamped between wall 96 and the body 78. The threaded portion 72 of member 34 is inserted through hole 94 and clamp nut 108 is threaded onto the externally threaded section 72. Chamber passage 116 is filled with electrolyte which is allowed to flow through vent passage 120 and out port 80. When the filled chamber has been vented, nut 108 is tightened against clamp frame wall 92, compressing seal 106 and closing vent port 80, thus sealing the electrolyte chamber 116 and port 38 from the atmosphere.

This subassembly is then inserted onto member 22 with guide flanges 82 disposed on either side of projection 66. As the forward edge of body 78 reaches surface 64, its rearward edge passes surface 68 and flanges 82 of the subassembly can drop down along a guided straight line path to seat membrane 40 on surface 60 of member 22 with port 26 in alignment with port 38. Thus membrane 40 is protected against both contamination and twisting or shear force while being installed. Clamp screw 104 is then tightened against surface 122 (see FIG. 4) compressing membrane 40 against surface 60, again with straight line force and without subjecting that membrane to twisting or shear forces, and providing a seal of both the sample (e.g. blood) channel and the electrolyte channel at that junction point. The sample flow path may be subjected to pressure cycling without distortion of the flow control member 40 or change in its mechanical or electrical characteristics.

Figure 4:
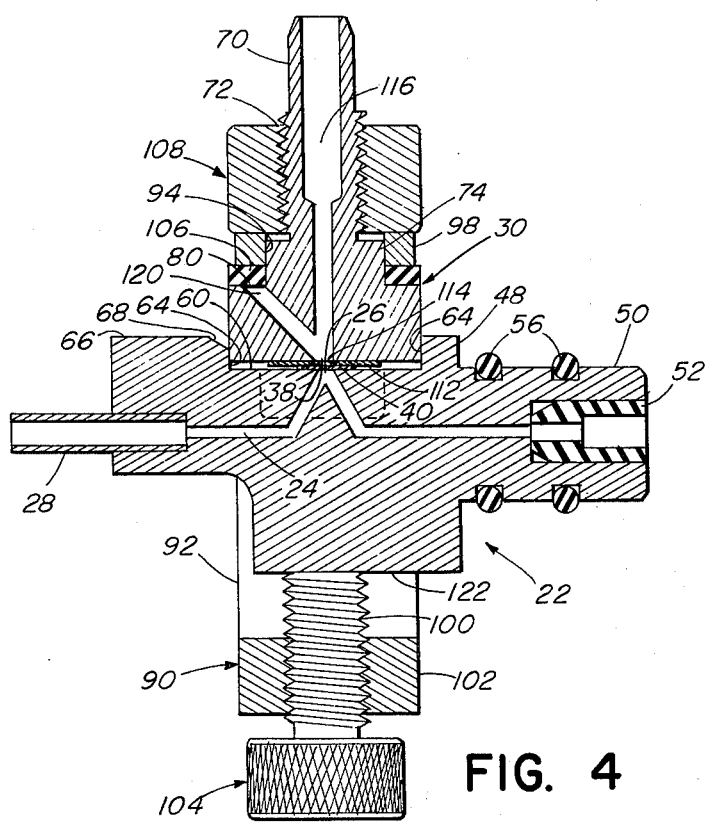
FIG. 4 is a sectional view showing the assembled relationship of components of the leak junction assembly.
Figure 5:
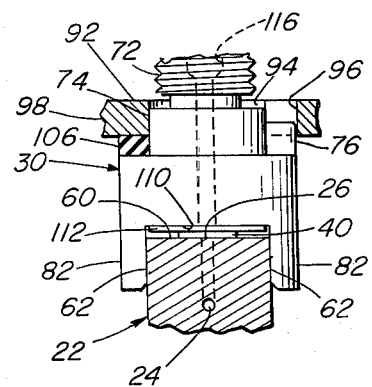
FIG. 5 is a sectional view of a portion of the assembly taken along the line 5—5 of FIG. 4.

The configuration of the system in this position may be seen with reference to FIGS. 4 and 5.

In operation, a sample of blood is induced into tubes 14 and 24. A measurement via circuitry 42 provides an indication of the pH value of the blood sample. After the measurement is completed, the blood sample is removed from the system and the flow passages 14 and 24 are cleaned by passing a flushing solution through those passages. The leak junction membrane 40 and the offset configuration of the flow passage adjacent that membrane provides a smooth flow path so that the exposed surface of membrane 40 can be efficiently and quickly cleaned and the fresh sample is uniformly dispsersed throughout its contact with membrane 40. pH readings are obtained rapidly and the resulting readings are in excellent agreement with the readings obtained using the same pH and reference electrodes in commercially available equipment having reference junctions of the open type. The membrane 40 may be readily replaced merely by releasing screw 104 so that the clamp frame 90 and electrolyte chamber subassembly may be slid from the sample frame member 22 and a new membrane support member 30 with a membrane disc 40 secured thereto substituted on frame 90 for reintegration as above described into the overall system. This replacement is accomplished rapidly and in a manner in which the membrane is protected and guided so that it is not subjected to contamination or shearing stress as it is being secured in position. Straight line force supplies pressure to seal the membrane against the opening defining structure. Excellent seals are achieved simply and rapidly and a reliable and accurate electrochemical analysis system is provided.

While a particular embodiment of the invention has been shown and described, various modifications will be apparent to those skilled in the art and therefore is not intended that the invention be limited to the disclosed embodiment or to details thereof and departures may be made therefrom within the spirit and scope of the invention as defined in the claims.

What is claimed is:

1. An electrode system for electrochemical analysis of a sample comprising structure defining a first chamber adapted to contain an electrolyte, structure defining a second chamber adapted to contain the material to be analyzed, each said chamber having a portion defining an opening therein, a flow control member carried by support structure of one of said chamber defining structures and disposed over the opening defining portion of said one chamber defining structure, said flow control member having a multiplicity of passages therethrough, the width of each passage being less than one-half micron such that a multiplicity of ionic junctions are adapted to be provided by said flow control member between electrolyte and the material to be analyzed, said first chamber defining structure including a vent passage extending between the opening defining portion of said first chamber defining structure and an external surface of said first chamber defining structure, said one chamber defining structure further including a guide surface which mates with a cooperating guide surface to establish straight line motion of the opening defining portion of said one chamber defining structure toward the other opening defining portion and alignment of the two chamber openings with said flow control member disposed between said openings while preventing rotation of either opening defining portion relative to the other opening defining portion for providing a controlled liquid flow path for establishing an ionic junction between the electrolyte and the sample material to be measured by the electrode system, and clamp structure for securing surfaces of said opening defining portions in juxtaposed relation while not imposing shear force on the said flow control member interposed between said opening defining portions, said clamp structure including a clamp member arranged to impose clamping force along the axis defined by said aligned openings and a frame member, said clamp member being threadedly received in said frame member and said frame member including interlock structure for receiving and preventing relative rotation of said flow control member and a seal member responsive to said clamp member for sealing said vent passage.

2. The system as claimed in claim 1 wherein said one chamber defining structure is a replaceable component and further including means securing said flow control member on said opening defining portion.

3. The system as claimed in claim 2 wherein said securing means is an adhesive member that has an opening which defines the effective reference electrolyte port.

4. The system as claimed in claim 3 wherein said flow control member is a membrane of hydrophillic polycarbonate material that has a multiplicity of substantially parallel passages of equal length that extend through the member.

5. A liquid junction flow control component for use in an electrode system for electrochemical analysis comprising
a housing having a flow control member support portion, a reference electrolyte passage having a port at said flow control member support portion, a sealable vent passage extending from said reference electrolyte passage to an external surface of said housing, protecting structure forward of said support portion, a flow control member secured to said support portion and extending across said port, said protecting structure providing protection for said flow control member, guide structure for mating engagement with cooperating guide structure to ensure straight line movement of said flow control member into clamped position without imposing shear force on said flow control member, clamp structure for generating straight line force to seal said flow control member against a cooperating surface defining a port in a sample flow passage, and a seal member disposed over said external surface of said housing arranged to be clamped by said clamp structure to seal said vent passage.

6. The component as claimed in claim 5 and further including an adhesive member securing said flow control member on said support portion.

7. The component as claimed in claim 6 wherein said adhesive member has an opening which defines the effective reference electrolyte port.

8. The component as claimed in claim 5 wherein said flow control member is a membrane of hydrophillic polycarbonate material that has a multiplicity of substantially parallel passages of equal length that extend through the member.

9. The component as claimed in claim 5 wherein said guide structure is formed in said protecting structure and includes spaced parallel guide surfaces on opposite sides of said flow control member that project forwardly thereof.

10. In an electrode system for electrochemical analysis of a sample including a liquid junction arrangement of the restricted flow type, the improvement comprising:
a replaceable structure provided with a chamber from a coupling section to a mating surface containing a port and a pair of flanges projecting from said mating surface, a flow control member concentrically secured over said port;
a liquid junction component member having a coupling section, a flange and a central body section provided with a planar surface and a pair of parallel guide surfaces extending from and normal to said planar surface, said component member being also provided with a through passage having a central bend portion communicating with a port formed in said planar surface; and a clamp structure including a frame having a pair of opposed openings, one of said openings designed to accommodate and secure against rotation said coupling section of said replaceable structure and the other of said openings designed to receive a clamp screw; whereby, said mating surface of said replaceable structure may be securely mated in straight-line motion to said planar surface of said component member so as to position said flow control member between said juxtaposed ports of said structure and said member.

11. In an electrode system for electrochemical analysis of a sample including a liquid junction arrangement of the restricted flow type, the improvement comprising:

a replaceable structure having a body portion provided with a chamber along its longitudinal axis from a coupling section to a mating surface at its other end containing a port and a pair of flanges projecting from said mating surface, a flow control member concentrically secured by an apertured self-adhering member over said port;

a liquid junction component member having a coupling section at one end, a flange and a central body section provided with a planar surface and a pair of parallel guide surfaces extending from and normal to said planar surface, and a projection at its other end, said component member being also provided with a through passage from its said coupling section to its said projection, said passage having a central bend portion communicating with a port centrally formed in said planar surface; and a clamp structure including a frame having a pair of opposed openings, one of said openings designed to accommodate and secure against rotation said coupling section of said replaceable structure and the other of said openings designed to receive a clamp screw whereby said mating surface of said replaceable structure may be securely mated in straight-line motion to said planar surface of said component member so as to position said flow control member between said juxtaposed ports of said structure and said member.

* * * * *